J. B. STEARNS.
Duplex Telegraph and Circuit Therefor.
No. 6,508. Reissued June 22, 1875.
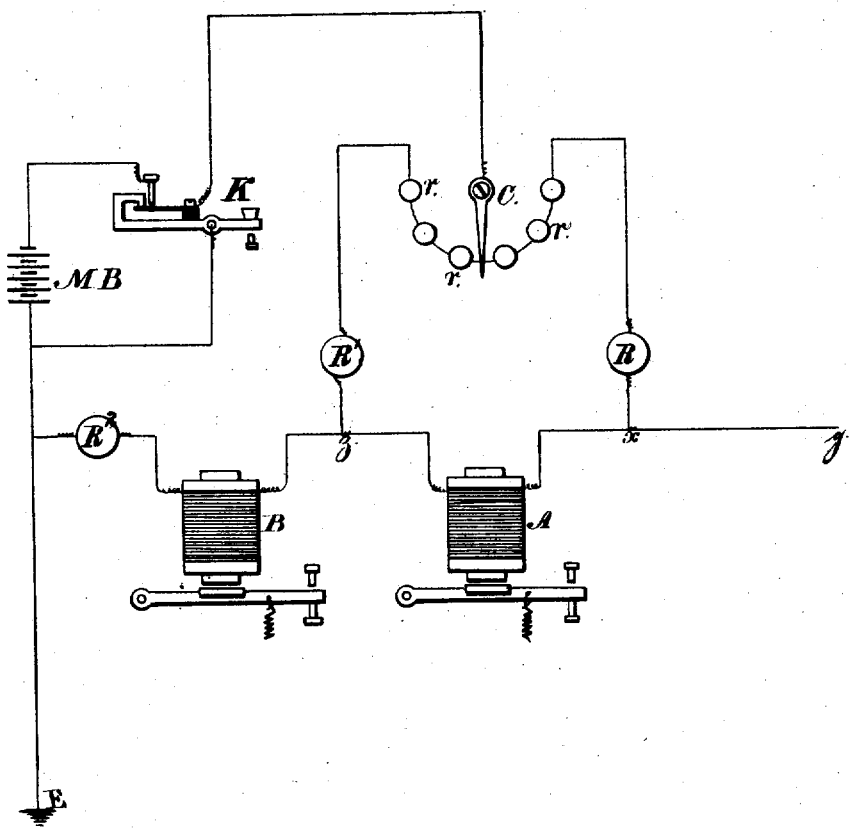
Witnesses
Chas H Smith
Geo. T. Puckney
Inventor
Joseph B. Stearns
per L. W. Serrell
atty
N. PETERS, Photo-Lithographer, Washington, D. C.

UNITED STATES PATENT OFFICE.

JOSEPH B. STEARNS, OF BOSTON, MASSACHUSETTS, ASSIGNOR TO THE WESTERN UNION TELEGRAPH COMPANY.

IMPROVEMENT IN DUPLEX TELEGRAPHS AND CIRCUITS THEREFOR.

Specification forming part of Letters Patent No. 132,932, dated November 12, 1872; Reissue No. 6,508, dated June 22, 1875; application filed March 20, 1875.

*To all whom it may concern:*

Be it known that I, JOSEPH B. STEARNS, of Boston, in the county of Suffolk and the State of Massachusetts, have invented certain Improvements in Duplex-Telegraph Instruments and Circuits therefor, of which the following is a specification:

This invention relates to an improved apparatus for the simultaneous transmission of telegraphic communications in opposite directions upon one and the same conductor or line-wire; and it consists of an improved arrangement of connections, whereby the receiving-instrument is so placed that it will not be affected by the opening or closing of the transmitting-key at the home-station, while at the same time it will respond to the opening and closing of the key at the distant station. It further consists in the employment of an electro-magnet, or other equivalent device, at the home-station, which responds to the movements of the transmitting-key at that station, while it remains entirely unaffected by the signals received from the distant station. The first-named object is attained by placing the receiving-instrument at a neutral point or bridge between the main line and an artificial line, each of which proceeds from a single point of contact common to both, and which is connected directly to the transmitting-key of the same station. By making use of a series of artificial resistances in conjunction with such contact-point, the resistances of the portions of the main line and of the artificial line which lie between the common contact-point and the respective points of junction with the receiving-instrument may be so adjusted with reference to each other that the said receiving-instrument will be at a neutral point with reference to the electric pulsations caused by the opening and closing of the transmitting-key at that station.

The second-named object is attained by placing an electro-magnet in a branch circuit or artificial line at the home-station, in such manner as to be actuated by a portion of the current of the main battery whenever the key at that station is depressed, and which electro-magnet may be used either to actuate a relay or as a sounding-instrument.

In the accompanying diagram one pole of the main battery M B is connected with the earth at E, and the other with the key K, which is opened and closed by the operator when transmitting a communication. A is the receiving-instrument, placed in the bridge *x z*, and this may be either an electro-magnetic or a chemical instrument. R $R^1$ are rheostats or artificial resistances, and *c* is a movable arm or contact-point, acting in conjunction with the series of intermediate resistances *r r r r r*, to determine by its position the proportion of the current flowing from the battery when the key is depressed, which shall pass, respectively, to the main line C *x y*, and to the artificial line C *z* E, so that the receiving-instrument in the bridge-wire *x z* will be at a nextral point, so far as the effect of opening and closing the transmitting-key at that station is concerned, and, therefore, such magnet A or other receiving-instrument will not respond to the signals sent from that station. A movable contact-point, in conjunction with a series of artificial resistances and a key or circuit-closer, is well known, and so also is the arrangement of circuits and artificial resistances usually known as the "Wheatstone Bridge or Balance;" hence an electrician can adjust the proportionate resistances in the different branches of the circuit so as to prevent any effect upon the home receiving-instruments from the currents set in action by the key at that station.

Thus, in the arrangement shown in the drawing, when the resistances in the different branches of the system are so adjusted that the resistance between C and *x* bears the same proportion to that between C and *z* as the resistance of the main line *x y* does to that of the artificial line *z* E, no current will pass through the bridge *x z* or the receiving-instrument A, if the key K is depressed.

In practice, however, the resistance of the main line *x y* is found to be subject to variations, which arise from defective insulation and other unavoidable causes, and such variations, if not compensated for, would destroy the proportion or ratio which it is necessary to maintain between the different branches of the circuit. This compensation or adjustment is preferably effected by means of the movable arm or contact-point C. By moving the point of contact along the series of resistances *r r r r r r*, the ratio of the resistance of the branch C *x* to that of the branch C *z* may readily be adjusted so as to correspond to the altered resistance of the main line *x y* relatively to that of the artificial or branch line *z* E, and thus without difficulty a balance may be maintained at the receiving-instrument. If, now, a current be set in action by the key at a distant station, it will, upon reaching the point *x*, find two paths open to it—one through R and C to the earth, at E, either direct or through the main battery, as the case may be, and the other through the bridge-wire and receiving-instrument A, and thence by *z* and $R^1$ to C, where it rejoins the first-mentioned route to the earth.

A portion of the current also diverges at the point *z*, and goes to the earth by the way of B and $R^2$; but, on account of the much greater resistance by this latter route, only a small portion of the whole current arriving at *x* will pass through it. The receiving-instrument A is consequently actuated by that portion of the current which passes through the bridge-wire *x z* when the key at the distant station is depressed.

The rheostat or artificial resistance $R^7$, which is placed in the artificial line between the point *z* and the pole of the main battery which is connected with the earth, may be made adjustable, or the adjustment may be effected entirely by means of the series of resistances R *r r r r* $R^1$.

For the purpose of enabling the operator at the home-station to hear the signals sent by him, I make use of an electro-magnet, B, placed in the artificial line between the key and the pole of the main battery, which is connected with the earth, so that a portion of the current of the main battery, after it divides at C, shall pass through such electro-magnet and cause it to respond, and this electro-magnet may actuate a sounding or recording apparatus, either directly or by means of a secondary circuit.

The electro-magnet B may constitute a portion or the whole of the resistance, which is inserted in the artificial line between the point *z* and the main battery-pole at E, and the adjustment of the different resistances is in either case made with reference thereto.

By the hereinbefore-described arrangement two operators at stations distant from each other may simultaneously make use of one and the same line-wire for transmitting different and distinct communications without either party interfering with the signals of the other, and such signals may be indicated or recorded by means of any suitable telegraphic receiving-instrument.

I claim as my invention—

1. A duplex telegraph having a receiving-instrument placed between the main line and an artificial line, and a connection from the transmitting-key to both sides of the receiving-instrument, so that such receiving-instruments may be at a neutral point with reference to the electric pulsations produced at that station, substantially as set forth.

2. A duplex telegraph containing a receiving-instrument placed at a neutral point, and an electro-magnet in the artificial line, substantially as set forth.

3. The combination of the receiving-instrument with the resistances R $R^1$ $R^2$, in the manner and for the purpose set forth.

4. The combination of the receiving-instrument and the resistances R $R^1$ $R^2$ with a series of smaller resistances, *r*, as and for the purpose set forth.

5. The combination of the receiving-instrument A with the electro-magnet B, as and for the purpose set forth.

Signed by me this 19th day of February, 1875.

J. B. STEARNS.

In presence of—
ROBT. M. HOOPER,
DAVID T. S. FULLER.